United States Patent
Muller

(10) Patent No.: US 8,811,980 B2
(45) Date of Patent: Aug. 19, 2014

(54) METHOD OF AUTOMATICALLY INDICATING SERVICES TO A MOBILE TERMINAL

(75) Inventor: Pierre-Jean Muller, Charenton le Pont (FR)

(73) Assignee: NEC Corporation, Tokyo (JP)

( * ) Notice: Subject to any disclaimer, the term of this patent is extended or adjusted under 35 U.S.C. 154(b) by 1228 days.

(21) Appl. No.: 12/158,238

(22) PCT Filed: Dec. 22, 2006

(86) PCT No.: PCT/JP2006/326301
§ 371 (c)(1),
(2), (4) Date: Jun. 19, 2008

(87) PCT Pub. No.: WO2007/073003
PCT Pub. Date: Jun. 28, 2007

(65) Prior Publication Data
US 2009/0291682 A1   Nov. 26, 2009

(30) Foreign Application Priority Data
Dec. 22, 2005   (FR) ..................... 05 54038

(51) Int. Cl.
| | |
|---|---|
| H04W 4/00 | (2009.01) |
| H04W 8/12 | (2009.01) |
| H04W 8/06 | (2009.01) |
| H04W 8/10 | (2009.01) |
| H04W 8/18 | (2009.01) |
| H04W 48/18 | (2009.01) |

(52) U.S. Cl.
CPC *H04W 8/12* (2013.01); *H04W 8/06* (2013.01); *H04W 8/10* (2013.01); *H04W 8/18* (2013.01); *H04W 48/18* (2013.01)

USPC ............... 455/432.1; 455/432.2; 455/432.3; 455/433; 455/435.1; 455/435.2; 455/443

(58) Field of Classification Search
CPC ........... H04W 8/06; H04W 8/12; H04W 8/18; H04W 48/18; H04W 8/10
USPC ........ 455/432.1, 433, 432, 405, 432.2, 432.3, 455/435.1, 435.2, 443
See application file for complete search history.

(56) References Cited

U.S. PATENT DOCUMENTS

| | | | |
|---|---|---|---|
| 6,122,510 A | 9/2000 | Granberg | |
| 6,671,510 B1 | 12/2003 | Kelly et al. | |
| 6,859,649 B1 * | 2/2005 | Denenberg et al. | 455/406 |
| 7,209,758 B1 * | 4/2007 | Moll et al. | 455/456.3 |
| 7,496,362 B2 * | 2/2009 | Wolfman et al. | 455/432.1 |
| 2002/0058494 A1 * | 5/2002 | Timonen et al. | 455/405 |
| 2002/0173307 A1 | 11/2002 | Salmivalli et al. | |
| 2005/0276229 A1 * | 12/2005 | Torabi | 370/252 |
| 2008/0020702 A1 * | 1/2008 | Jendbro et al. | 455/3.01 |

FOREIGN PATENT DOCUMENTS

| | | |
|---|---|---|
| CN | 1286876 A | 3/2001 |
| WO | 03/043367 A1 | 5/2003 |
| WO | 2004/100595 A1 | 11/2004 |

* cited by examiner

*Primary Examiner* — Khalid Shaheed
(74) *Attorney, Agent, or Firm* — Sughrue Mion, PLLC

(57) ABSTRACT

This invention relates to a method of indicating available services to a mobile telecommunications terminal roaming between a first geographic area and a second geographic area. When the terminal is authenticated in the second geographic area, a list which comprises the services physically available in the said second geographic area is determined and is transmitted to the terminal.

10 Claims, 1 Drawing Sheet

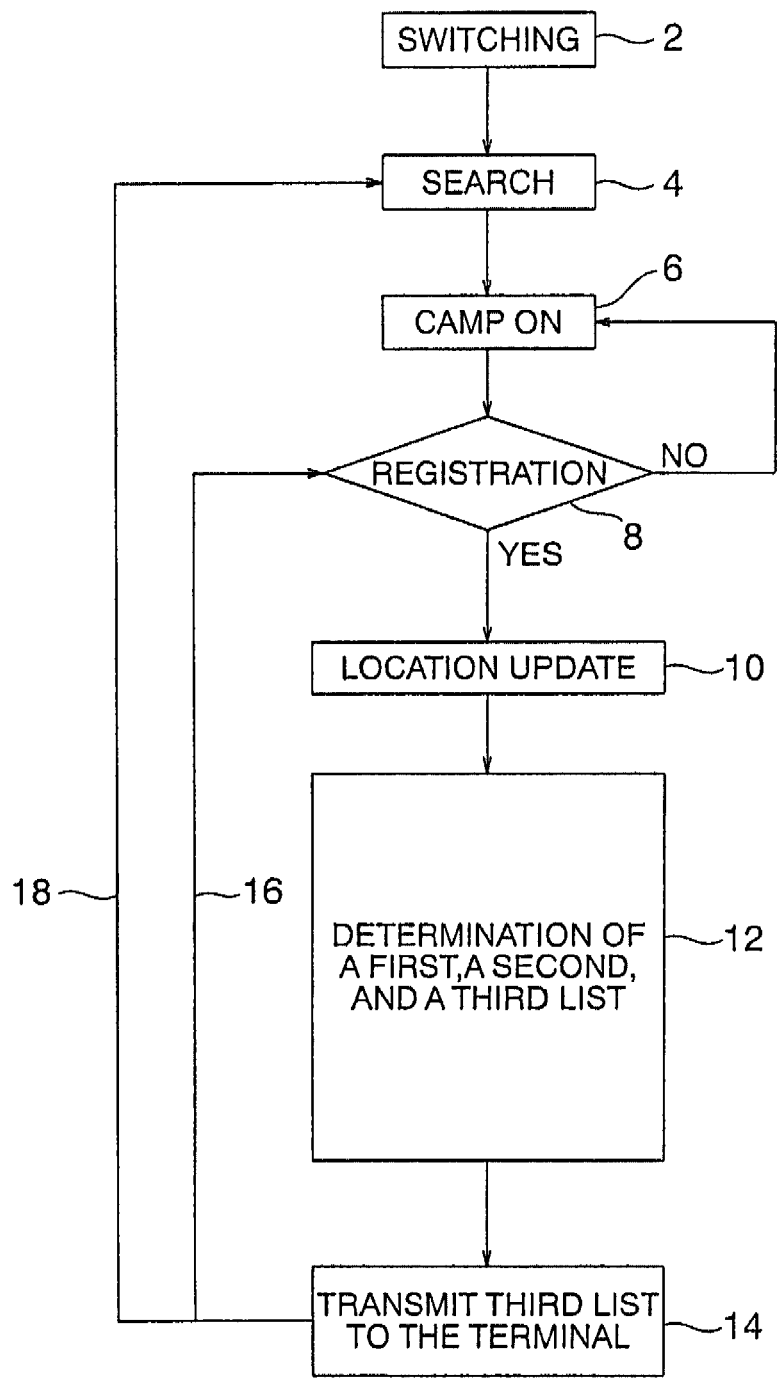

METHOD OF AUTOMATICALLY INDICATING SERVICES TO A MOBILE TERMINAL

BACKGROUND OF THE INVENTION

1. Technical Field

The invention is in the domain of mobile telecommunications and more specifically relates to a method of automatically indicating available services to a mobile telecommunications terminal roaming between a first geographic area and a second geographic area.

The invention also relates to a telecommunications system in which a mobile terminal is roaming between a first geographic area and a second geographic area.

2. Prior Art

In a cellular telecommunications network, a geographic area comprises a limited number of uniquely identified cells in which the network sends paging messages to determine the location of a terminal in the network and to notify it that a call is being made to it. This message is transmitted through a particular radio message channel called PCH ("Paging Channel"). The GSM-GPRS and UMTS standards define several areas called LAs (« (Location Area)» ) for the circuit domain, and RA (« Routing Area» ) for the packet domain comprising several adjacent cells.

In the circuit switching domain, the location areas LA are managed by the MSC/VLR module comprising the Mobile Service Switching Center switch (MSC), and a Visitor Location Register (VLR) database containing information related to subscribers in standby mode.

In the packet switching domain (GPRS and UMTS), routing areas RA are managed by the Serving GPRS Support Node (SGSN) that is the equivalent of the MSC/VLR module for services in packet mode.

After being registered on the network, a terminal executes an update procedure in the core network of the current area, after each change of the location area. The terminal knows the area in which the current cell is located due to the information broadcast on a beacon channel associated with each cell (BCCH, Broadcast Control Channel).

A telecommunications network knows the services available in a geographic area covering one or several of its cells independently of the radio coverage quality in this area. Availability of these services for a mobile terminal is defined and known statically by the network, independently of the reception quality in this area.

The technical specifications in the 3GPP standard are not sufficient to enable a mobile terminal camping on a cell in a Routing Area (RA) to easily and quickly know the available services in this area without the need for an active search for services.

According to these specifications, the user must make a series of tests to find a service in the area in which he is located after an inter-system transfer or after the terminal has been reinitialised. This generates an unnecessary consumption of available energy.

The purpose of the invention is to enable a user of a mobile telecommunications terminal to easily and quickly know the services available in a roaming area in a cellular telecommunications network in which the terminal has registered after an intercellular or an intersystem (HPLMN or VPLMN) transfer.

DISCLOSURE OF THE INVENTION

The invention recommends a method by which a cellular network can notify a mobile terminal about available services at the time of its registration or after registration to this network when this terminal moves between a first geographic area and a second geographic area, the two areas being covered by the same network but possibly having different available services, or when the terminal moves between a first geographic area covered by a first network and a second geographic area covered by a second network and camps on a cell located in said second geographic area.

The method according to the invention comprises the following steps:
  authenticate the terminal in the second geographic area;
  determine a list comprising the services that are physically available in said second geographic area;
  transmit said list to the terminal.

The method according to the invention is preferably used when the terminal moves between a first area covered by a first cellular network and a second area covered by a second cellular network different from the first network.

In this case, the determined list of services comprises services that are physically available in said second area and are also accessible to the terminal because of a roaming agreement between the first network and the second network.

For example, the HPLMN network is a UMTS network and the VPLMN network is a GSM network, or the HPLMN network is a GSM network and the VPLMN network is a UMTS network.

The method according to the invention is applicable in a telecommunications system comprising:
  means of authenticating the terminal in the second geographic area;
  means of determining a list comprising the services that are physically available in said second geographic area;
  means of transmitting said list to the terminal.

In a first embodiment, said first area and the second area are covered by the same cellular network.

In a second embodiment, the first area is covered by a first cellular network and the second area is covered by a second cellular network different from the first network.

In this second embodiment, the list of services includes services that are physically available in said second area and are also accessible to the terminal because of a roaming agreement between the first network and the second network.

BRIEF DESCRIPTION OF THE DRAWINGS

FIG. 1 illustrates the main steps in the method according to the invention.

BEST MODE FOR EMBODYING THE INVENTION

In the remainder of this description, the term "service" represents a wide range of features, for example such as the allocation of bearer services, access to tele-services (tele-service access technologies), voice services, video services, combination of CS circuit switching services and IMS (Information Message Services), MMS (Multimedia Message Services), HSDPA (High Speed PS connectivity) services,), WLAN (Wireless Local Area Network) connectivity service, etc.

The method will be described in a particular example in which the mobile terminal, initially camped on a cell located in a first area of a first 3G network, is switched on again in a second area comprising cells covered by a second 3G network.

With reference to the appended figure, the terminal is switched on again in the second area in step 2.

In step 4, the terminal searches for a cell in this second area.

In step 6, the terminal camps on the found cell. When it camps on a cell in the network, it determines the type of network in which it is located (step 8) and then performs either a registration procedure (Attach) or a location update procedure (step 10), depending on the type of network found.

When the terminal is authenticated and is authorised to register itself on the found network, the network determines (step 12) a first list comprising the services that are physically available in the coverage area in which the terminal is physically located, and a second list comprising the services subscribed to by the terminal user in the first network, in other words the network in which the user has his subscription (HPLMN).

According to one essential characteristic of the invention, the visited network (VPLMN), in other words the second network found by the terminal, determines a third list from the first and second lists, containing services that are physically available in the second area and for which there is also a roaming agreement between the first network and the second network according to which the second network agrees to provide these services to subscribers in the first network when these subscribers are located in an area covered by this second network in which said services are physically available.

In step 14, the second network transmits said third list to the terminal.

When the terminal makes a new registration or a new location update procedure, the method is reinitialised started from step 8 (arrow 16).

Similarly, when the terminal loses the service, the method is reinitialised starting from step 4 (arrow 18).

With the method according to the invention, the terminal can automatically display the list of services available in a geographic area covered by a visited network (VPLMN) and accessible to the terminal because of a roaming agreement between this VPLMN network and the subscriber's HPLMN network, regardless of location areas and routing areas. In addition, the invention is applicable to any other network than the GSM network and the UMTS network.

The invention claimed is:

1. A method of automatically indicating available services to a mobile telecommunications terminal roaming between a first geographic area and a second geographic area, the method comprising:
    a network authenticating the terminal in the second geographic area,
    a network determining a first list comprising services physically available in said second geographic area and a second list comprising services subscribed by the terminal in the first geographic area without receiving a request regarding services from the terminal, determining a third list from the first list and the second list,
    a network transmitting said third list to the terminal, and
    a network automatically displaying the third list in the terminal.

2. A method set forth in claim 1 in which, the first area and the second area are covered by a cellular network.

3. A method set forth in claim 1 in which, the first area is covered by a first cellular network and the second area is covered by a second cellular network different from the first network.

4. A method set forth in claim 1, in which the said third list of services comprises services that are both physically available in said second area and also accessible to the terminal because of a roaming agreement between the first network and the second network.

5. A method set forth in claim 4 in which said first network is the home network of a user of the Home PLMN (HPLMN) terminal, and said second network is a Visited network (VPLMN) in which the terminal registers after an intersystem and/or intercellular handover.

6. A method set forth in claim 5 in which the first network is a UMTS network (or a GSM network), and said second network is a GSM network (or a UMTS network).

7. A telecommunications system in which a mobile terminal is roaming between a first geographic area and a second geographic area, the system comprising:
    means for authenticating the terminal in the second geographic area,
    means for determining a first list comprising services physically available in said second geographic area and a second list comprising services subscribed by the terminal in the first geographic area without receiving a request regarding services from the mobile terminal,
    means for determining a third list from the first list and the second list, and
    means for transmitting said third list to the terminal,
    wherein the mobile terminal comprises means for automatically displaying the third list.

8. A system set forth in claim 7, in which the first area and the second area are covered by a common cellular network.

9. A system set forth in claim 7, in which the first area is covered by a first cellular network and the second area is covered by a second cellular network different from the first network.

10. A system set forth in claim 7, in which said third list of services comprises services that are both physically available in said second area and also accessible to the terminal because of a roaming agreement between the first network and the second network.

* * * * *